April 21, 1970 J. M. RUBIN 3,507,043
ORTHODONTIC PLIERS
Filed Oct. 24, 1967
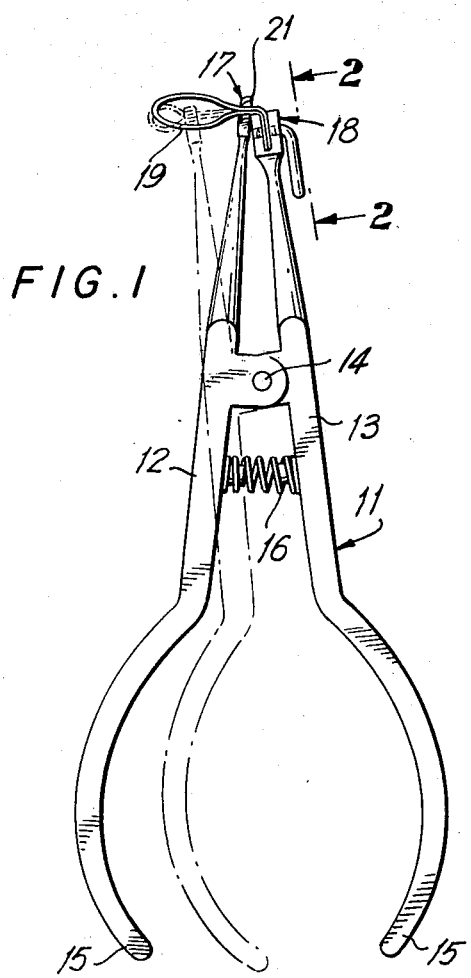
FIG. 1
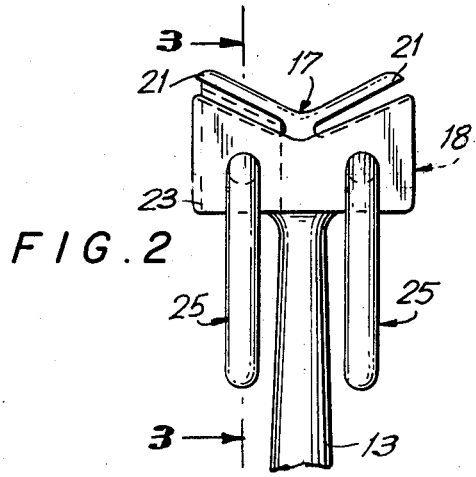
FIG. 2
FIG. 3
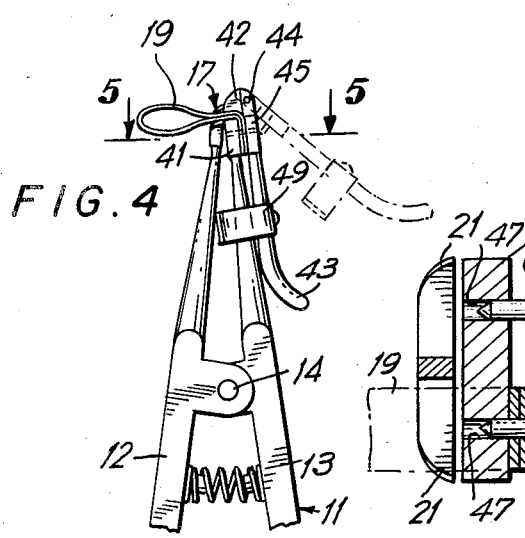
FIG. 4
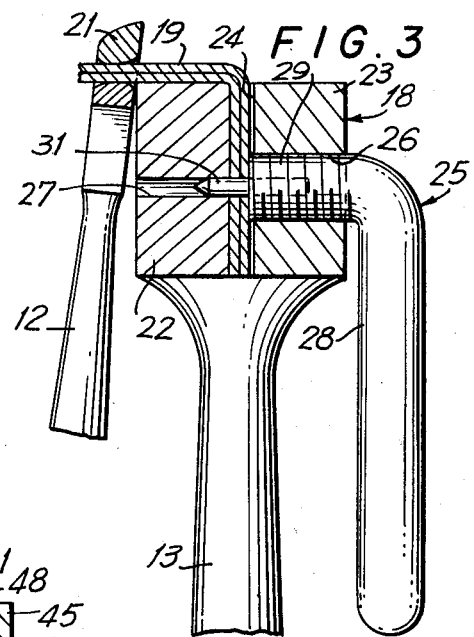
FIG. 5
INVENTOR.
JAMES M. RUBIN

United States Patent Office 3,507,043
Patented Apr. 21, 1970

3,507,043
ORTHODONTIC PLIERS
James M. Rubin, 141 W. 17th St.,
New York, N.Y. 10011
Filed Oct. 24, 1967, Ser. No. 677,627
Int. Cl. A61c 5/12
U.S. Cl. 32—63                                  2 Claims

ABSTRACT OF THE DISCLOSURE

Orthodontic pliers for forming a tooth band around and in conformity with a tooth in which the free ends of the band material are clamped in the pliers by means which pierce the band material.

The band material is clamped to one jaw of the pliers and a forming beak is provided on the other jaw. The forming beak has a slot which receives the band material to work the band in a flattened position to form a loop end on the band snugly around a tooth.

BACKGROUND OF THE INVENTION

This invention relates generally to orthodontic pliers and more particularly to pliers known as band forming pliers. Such pliers are well known in the art and are used for forming band material about a tooth into conformity with the surface of the tooth. The band material is ribbon like and a selected length is cut from a supply reel. The ribbon is then folded over and the ends gripped by one jaw of a pliers. The other jaw is slotted so as to receive the band material in the slot. The loop in the band is placed about a tooth and manipulation of the pliers tightens the band about the tooth and causes it to closely conform to the surface of the tooth In the utilization of prior art pliers, the gripping of the end of the ribbon like band material has often been deficient. In one type of pliers, a compressible clamp is formed on one jaw and a knurled knob is finger tightened in an attempt to frictionally secure the ends of the band in the clamp. During the utilization of the pliers in the tightening of the band around the tooth, the pull on the band material will often pull the ends of the band out of the clamp.

In another prior art arrangement, the looped over band material is welded together in one or two places and then passed over a jaw of the pliers in order that the ends may be pulled while the band is being tightened about the tooth. If the weld is deficient in any respect, the ends of the band will separate during the tightening operation and the mere requirement for the welding together of the band material introduces an additional time consuming operation in the procedure.

The instant invention is designed to overcome the foregoing deficiencies.

SUMMARY OF THE INVENTION

Generally speaking, in accordance with the instant invention, the jaw or beak of the pliers which must grip the ends of the band material is provided with means to pierce the band material in order to prevent pull out of same during the band forming operation. A piercing pin is supported by the beak and pierces the band material in order to fixedly clamp the band material in the beak until it is desired to release same.

Accordingly, it is an object of this invention to provide band forming pliers which secure the ends of the band in an improved manner and with greater reliability.

Another object of the invention is to provide, in a band forming pliers, means for piercing the band material proximate to the ends thereof for securing same during a band forming operation.

A further object of the invention is to provide an improved band forming pliers which is simple to manipulate but which holds the ends of the band in an improved manner.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which:

FIG. 1 is an elevational view of an embodiment of the invention, with an operative position of the pliers being shown in phantom lines;

FIG. 2 is a view, at an enlarged scale, looking in the direction of arrows 2—2 of FIG. 1;

FIG. 3 is a sectional view taken along line 3—3 of FIG. 2;

FIG. 4 is a partial elevational view of another embodiment of the instant invention, with the band clamping means being shown in full and phantom line positions; and FIG. 5 is a sectional view, at an enlarged scale, taken along line 5—5 of FIG. 4.

DESCRIPTION OF THE PREFERRED EMBODIMENTS

Referring now to FIGS. 1 through 3, a band forming pliers 11 has a first jaw 12 pivoted to a second jaw 13 at a pivot 14. Each jaw has a handle portion 15 by which the pliers may be manipulated and a spring 16 cast between the jaws to bias the pliers to the closed position. At the end of first jaw 12 is a band forming beak 17 which is used to squeeze the band around and against the surface of a tooth. At the end of second jaw 13 is a band gripping beak 18 constructed in accordance with a preferred embodiment of the invention. The band is indicated at 19.

Band forming beak 17 is known in the art and, in the embodiment shown, is provided with two slotted wings 21. The slots in the wings are sufficiently wide to receive therein a double thickness of band material as shown in FIG. 1. In some pliers, only a single wing is provided and a single wing may be either a left wing or a right wing, depending on the portion of the patient's mouth in which the pliers must be manipulated. Also, the contour of the wings will depend on whether the pliers are to be used for anterior teeth or posterior teeth, all in accordance with known prior art.

Band gripping beak 18 is best shown in FIGS. 2 and 3. Formed as part of the outer end of second jaw 13 is an anvil 22 and a plate 23 defining a slot 24 therebetween for receiving the band material. The width of band gripping beak 18 will depend on the width of the band forming beak. In other words, if a single wing 21 is provided, the band gripping beak will be of a single width while, if two slotted wings are provided, the band gripping beak will be of a double width. The double width arrangement is shown in the drawing.

A band piercing element 25 is provided for each of the wings. Plate 23 is provided with a threaded aperture 26 coaxial with a bore 27 in anvil 22. The band piercing element may consist of an L-shaped lever 28 having a threaded end 29 which carries a pointed pin 31. Lever 28 threadably engages threaded aperture 26 and advances pointed pin 31 into bore 27.

In order to set up the pliers for applying a band to a tooth in the manner as shown in FIG. 1, a length of band material is folded over, passed through a selected slotted wing 21 and inserted in slot 24 between the plate and the anvil. Of course, prior to insertion, lever 28 has been threaded so as to fully withdraw pointed pin 31 and, after the ends of the band are wholly within slot 24, lever 28 is rotated to advance pin 31 through the band material and into bore 27.

In this manner, the ends of the band material are secured in the band gripping beak and the loop of band material shown in full lines in FIG. 1 can be placed about the tooth. By squeezing the handle portions, the jaws are separated so as to slide band forming beak 17 along the band thereby tightening the band about the tooth and forming it into conformity with the surface of the tooth.

To release the formed band, it is merely necessary to unscrew lever 28.

Another embodiment of the band gripping beak is shown in FIGS. 4 and 5. An anvil 41 formed at the outer end of second jaw 13 includes a projection 42 to which a locking lever 43 is pivoted as at 44. The locking lever carries a plate portion 45 which is fixedly secured a pair of pointed pins 46, two pins being required when the band forming beak has two slotted wings. A bore 47 is provided in anvil 41 for each of pointed pins 46 and, in the closed position of locking lever 43, a slot 48 is defined between plate portion 45 and anvil 41. A spring clip 49 is secured to locking lever 43 and is adapted to resiliently clip over second jaw 13 to hold the locking lever in closed position.

In order to mount an unformed band in the pliers shown in FIGS. 4 and 5, locking lever 43 is rotated to the phantom line position shown in FIG. 4 to withdraw pins 46 from bores 47. The band material is folded over and threaded through the selected slotted wing and the ends of the band are placed against anvil 41. Locking lever 43 is rotated toward the closed position and one of pointed pins 46 pierces the band material and enters its respective bore 47 to thereby rigidly secure the band to the band gripping beak. Spring clip 49 engages around a portion of second jaw 13 and resiliently holds the gripping beak in the closed position while the band is formed about the patient's tooth in the manner described above. To remove the band from the pliers, it is merely necessary to rotate the locking lever from the closed position and withdraw the band.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

What is claimed is:

1. An orthodontic pliers comprising a pair of pivoted jaws having handles for controlling same, band forming means on one of said jaws, and band holding means on the other of said jaws, said band holding means including an anvil, a bore in said anvil, and means carrying a pin for piercing orthodontic band material and releasably holding said pin in a position extending through the pierced orthodontic band and into said bore, said means carrying a pin including a plate pivoted to said anvil and spaced from said anvil when said pin extends into said bore to define a band receiving slot between said anvil and said plate, the longitudinal axis of said bore being perpendicular to the longitudinal axis on which said jaws are pivoted, said axes lying in spaced planes.

2. An orthodontic pliers as claimed in claim 1 and including spring means for resiliently and releasably holding said plate in a pivoted position wherein said pin extends into said bore.

References Cited

UNITED STATES PATENTS

| | | | |
|---|---|---|---|
| 1,177,223 | 3/1916 | Angle | 32—63 XR |
| 1,612,950 | 1/1927 | Smith | 32—63 |

ROBERT PESHOCK, Primary Examiner